Nov. 15, 1927.
W. F. CARLTON
TRAP FOR RODENTS
Filed Nov. 27, 1925
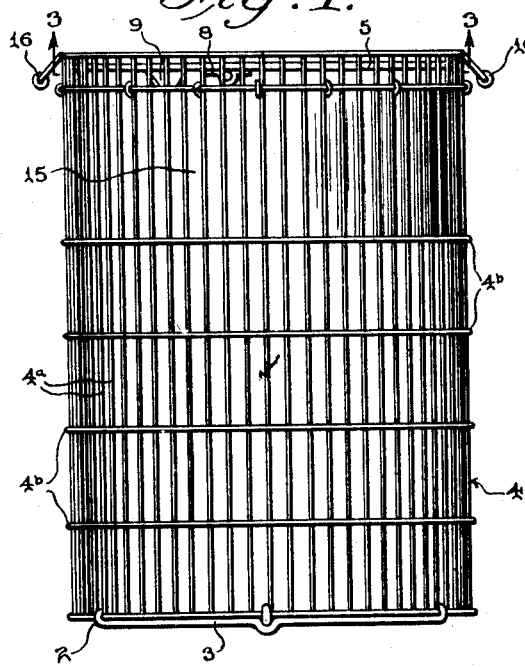
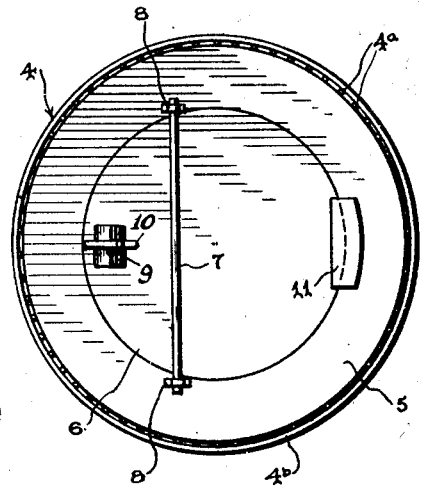
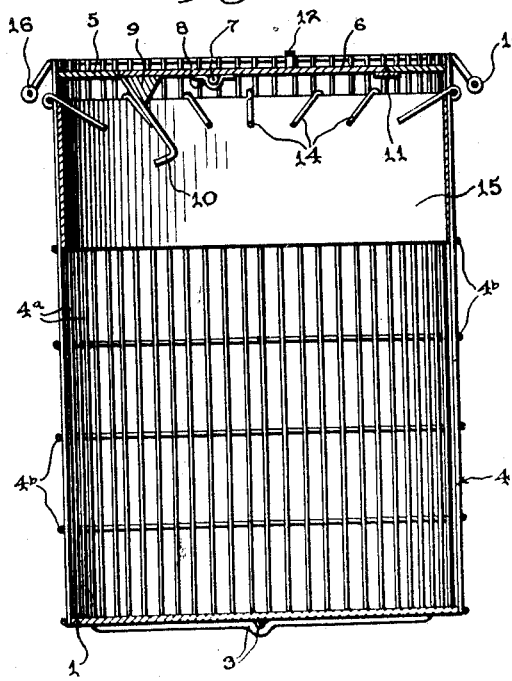
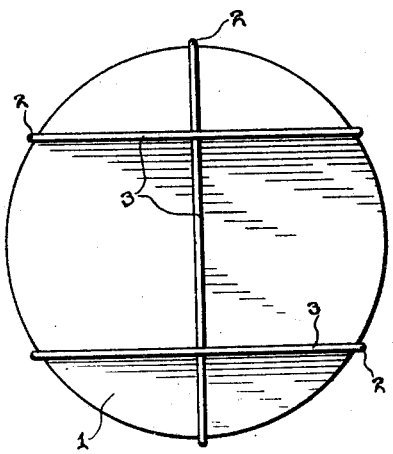
INVENTOR.
W. F. Carlton
ATTORNEYS.

Patented Nov. 15, 1927.

1,649,663

UNITED STATES PATENT OFFICE.

WILLIAM F. CARLTON, OF MASSILLON, OHIO.

TRAP FOR RODENTS.

Application filed November 27, 1925. Serial No. 71,677.

The object of the invention is to provide a trap in which the victims are caught alive for destruction, after the capacity of the trap is reached, by the immersion of the device with the contained victims in a receptacle filled with water; and to provide a construction of this character which may be easily and cheaply manufactured and therefore marketed at low cost.

With this object in view, the invention consists in a construction and combination of parts of which a preferred embodiment is illustrated in the accompanying drawings, wherein:

Figure 1 is a side elevational view of the invention.

Figure 2 is a central vertical sectional view of Figure 1.

Figure 3 is a transverse sectional view on the plane indicated by the line 3—3 of Figure 1.

Figure 4 is a bottom plan view.

The cage or basket constituting the body of the trap consists of a metallic bottom 1 of circular form and provided with uniformly spaced upstanding posts 2 consisting of portions of wire rods 3 disposed in spanning relation to the bottom as indicated in the bottom plan view of Figure 4. Bounding the posts 2 and secured thereto is a wire netting 4 consisting of the vertical wires $4^a$ and circumferential wires $4^b$.

At the upper ends of the posts is carried an annular plate 5 united with the wires and posts at the upper ends thereof and defining the top wall or top of the cage. The opening in the top wall receives a trap door 6 of circular form provided with a pintle 7 pivotally mounted in brackets 8 carried by the top 5. The pintle is disposed in the position of a chord on one side of which and on the under face of the door is carried the weight 9 with which is connected the stop 10 disposed normally at an acute angle to the under face of the door. The weight being carried by the door on one side of the pintle tends to lower that side of the door and, therefore, to raise the opposite side which is precluded from rising above the plane of the top by a stop plate 11.

Carried upon the top face of the door is a bait eye 12 in which bait of any suitable form may be inserted to entice rodents to the top of the cage and onto the door, when their weight will depress the door and precipitate them into the basket, that portion of the door on the opposite side of the pintle rising above the plane of the top until the stop 10 engages the under face of the top. This arrangement prevents the weight ever passing through the vertical plane of the pintle and, therefore, insures the door always being returned to closed position.

Downwardly directed prongs 14 are disposed within the cage and uniformly spaced around the periphery thereof to constitute obstructions in the event that the entrapped rodents undertake to jump up against the top, and to preclude any effective climbing up the netting, a sheet metal liner 15 is provided on the interior of the netting and just below the plane of the spurs or prongs.

Handles 16 are provided to permit ready carrying of the device and when it contains any entrapped animals, it may be transported to any suitable point where there is a vessel containing water and immersed in said water to drown the animals. They may thereafter be removed by opening the trap door. The stop 10 connected with the closing or balancing weight 9 is flexible and, therefore, when the door is opened to its full normal position, the stop may be deflected to disengage it from the top 5, so that the door may be disposed in vertical position, thus providing a larger opening for the removal of the dead animals.

The invention having been described, what is claimed as new and useful is:

A trap comprising a wire cage having a top wall with an opening formed therein, a door pivotally mounted in said opening with the pivot point at an intermediate point on the door, and a weight on the under face of the door on one side of the pivot and a stop on the under face of the door at the other side of the pivot adapted for engagement with the under face of the top, the door having a stop on that side of the pivot with the weight to limit opening movement of the door, said last named stop being flexible to permit its disengagement to allow the door to move to full open position.

In testimony whereof he affixes his signature.

WILLIAM F. CARLTON.